United States Patent
Itaya

(10) Patent No.: US 10,600,132 B2
(45) Date of Patent: Mar. 24, 2020

(54) SUPPLY-DEMAND CONTROL DEVICE, CHARGE-DISCHARGE CONTROL DEVICE, POWER STORAGE DEVICE, SUPPLY-DEMAND CONTROL SYSTEM, AND SUPPLY-DEMAND CONTROL METHOD

(71) Applicant: MITSUBISHI ELECTRIC CORPORATION, Chiyoda-ku (JP)

(72) Inventor: Nobuhiko Itaya, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 282 days.

(21) Appl. No.: 15/327,287

(22) PCT Filed: Jul. 24, 2014

(86) PCT No.: PCT/JP2014/069619
§ 371 (c)(1),
(2) Date: Jan. 18, 2017

(87) PCT Pub. No.: WO2016/013089
PCT Pub. Date: Jan. 28, 2016

(65) Prior Publication Data
US 2017/0186108 A1 Jun. 29, 2017

(51) Int. Cl.
*G06Q 50/06* (2012.01)
*H02J 3/00* (2006.01)
(Continued)

(52) U.S. Cl.
CPC ............ *G06Q 50/06* (2013.01); *G06F 1/266* (2013.01); *H02J 3/00* (2013.01); *H02J 3/008* (2013.01);
(Continued)

(58) Field of Classification Search
CPC .............. G06F 1/266; H02J 3/00; H02J 3/008
See application file for complete search history.

(56) References Cited

U.S. PATENT DOCUMENTS 6,757,628 B1 * 6/2004 Anderson .............. G06Q 50/06
702/85
8,862,281 B2 10/2014 Yoneda et al.
(Continued)

FOREIGN PATENT DOCUMENTS

JP 2004-336890 A 11/2004
JP 3980541 B2 4/2005
(Continued)

OTHER PUBLICATIONS

International Search Report (PCT/ISA/210) dated Oct. 21, 2014, by the Japanese Patent Office as the International Searching Authority for International Application No. PCT/JP2014/069619.
(Continued)

*Primary Examiner* — Robert E Fennema
*Assistant Examiner* — Santosh R Poudel
(74) *Attorney, Agent, or Firm* — Buchanan Ingersoll & Rooney PC

(57) ABSTRACT

A supply-demand control device connected through a communication network to a charge-discharge control device to control charge and discharge of a power storage device connected to a power distribution line in a power distribution system managed by a community, the supply-demand control device including a load and power-generation-amount estimation unit to estimate a load and a power generation amount as a planned load and power generation amount; a first-evaluation-function calculation unit to calculate a value of a first evaluation function, which is a sum of a power purchase cost, a natural-discharge loss cost, a storage-battery life-span cost, a power-transmission loss cost, and a charge-discharge loss cost; a planned charge-
(Continued)

discharge command calculation unit to calculate the charge-discharge command amount by which the first evaluation function is minimized; and a power-purchase plan output unit to create a power purchase plan based on the charge-discharge command.

17 Claims, 8 Drawing Sheets

(51) Int. Cl.
  *H02J 13/00*  (2006.01)
  *H02J 3/32*  (2006.01)
  *H02J 7/00*  (2006.01)
  *G06F 1/26*  (2006.01)
  *H02J 3/14*  (2006.01)

(52) U.S. Cl.
  CPC .............. *H02J 3/32* (2013.01); *H02J 7/0068* (2013.01); *H02J 13/0055* (2013.01); *H02J 13/0086* (2013.01); *H02J 2003/003* (2013.01); *H02J 2003/007* (2013.01); *H02J 2003/146* (2013.01); *Y04S 10/54* (2013.01); *Y04S 10/56* (2013.01); *Y04S 50/10* (2013.01)

(56) References Cited

U.S. PATENT DOCUMENTS

| | | | |
|---|---|---|---|
| 2004/0254899 A1* | 12/2004 | Abe ................. G06Q 10/06 705/412 |
| 2011/0127949 A1* | 6/2011 | Taki ................. H02J 7/041 320/107 |
| 2011/0208637 A1 | 8/2011 | Wakita et al. |
| 2012/0256487 A1* | 10/2012 | Yamada ............. H01M 10/44 307/43 |
| 2012/0296836 A1* | 11/2012 | Hisano .............. H01M 8/00 705/317 |
| 2013/0300374 A1 | 11/2013 | Tomita et al. |
| 2014/0005852 A1* | 1/2014 | Asghari ............. G06F 1/26 700/295 |
| 2014/0142772 A1* | 5/2014 | Kubota ............. G06Q 50/06 700/291 |
| 2014/0186675 A1* | 7/2014 | Boettcher .......... H01M 2/1077 429/99 |
| 2014/0379151 A1 | 12/2014 | Tokuda et al. |
| 2015/0066403 A1* | 3/2015 | Kashiwagi ........ G06Q 50/06 702/60 |
| 2015/0130404 A1* | 5/2015 | Luo .................. H02J 7/0016 320/107 |
| 2017/0005483 A1* | 1/2017 | Miyake ............. H02J 3/32 |
| 2017/0373542 A1* | 12/2017 | Jung ................. H02J 50/80 |

FOREIGN PATENT DOCUMENTS

| | | |
|---|---|---|
| JP | 2005-143218 A | 6/2005 |
| JP | 2008-141918 A | 6/2008 |
| JP | 2011-175556 A | 9/2011 |
| JP | 2012-205490 A | 10/2012 |
| JP | 2013-106372 A | 5/2013 |
| JP | 2013-176188 A | 9/2013 |
| WO | WO 2011/042787 A1 | 4/2011 |
| WO | WO 2012/066651 A1 | 5/2012 |
| WO | WO 2013/099156 A1 | 7/2013 |

OTHER PUBLICATIONS

Written Opinion (PCT/ISA/237) dated Oct. 21, 2014, by the Japanese Patent Office as the International Searching Authority for International Application No. PCT/US2014/069619.
Saito, T., "Report on Smart Grid Verification Test", Smart Grid, vol. 4, No. 2, pp. 25-31, Apr. 15, 2014.
Ishida, M.,"Power Supply Services: Predicting Power Supply from Data of Internet Reservations, Rakuten to Develop Support System of Balancing", IT Media Inc, Internet:URL:http://www.itmedia.co.jp/smartjapan/articles/1406/06/news024.html, Jun. 6, 2014.
"Clarify roles of CEMS into "peak cut" and supply and demand adjustment", New Energy Promotion Council, Internet:URL:jscp.nepc.or.jp/article/jscp/20131121/374428/print.shtml, Nov. 21, 2013.
Office Action (Notification of Reasons for Refusal) dated Feb. 6, 2018, by the Japanese Patent Office in corresponding Japanese Patent Application No. 2016-238176 and English translation of the Office Action. (7 pages).

* cited by examiner

SUPPLY-DEMAND CONTROL DEVICE, CHARGE-DISCHARGE CONTROL DEVICE, POWER STORAGE DEVICE, SUPPLY-DEMAND CONTROL SYSTEM, AND SUPPLY-DEMAND CONTROL METHOD

FIELD

The present invention relates to a supply-demand control device, a charge-discharge control device, a power storage device, a supply-demand control system, and a supply-demand control method.

BACKGROUND

The technology to make effective use of power in the entire community, such as a smart community, is being discussed recently. For example, Patent Literature 1 discloses a technique for the community as described above to create an operation plan for a power supply device and an energy storage device that are installed to be distributed within the community, based on the power price.

CITATION LIST

Patent Literature

Patent Literature 1: Japanese Patent No. 3980541

SUMMARY

Technical Problem

Meanwhile, there is a growing need for a stationary storage-battery system to be used for reducing the electric rate by taking advantage of the difference in the electric rate between time periods, and for absorbing the variations in output of power generated by using natural energy such as solar light.

In an attempt to make effective use of power in the entire community, a plurality of stationary storage-battery systems are installed within the community. In the technique described in Patent Literature 1, an optimal operation plan is created based on the power price. However, this plan does not take into account a cost increase due to a reduction in life-span of a storage-battery system such as a stationary storage-battery system, caused by charge and discharge of the storage-battery system, a cost increase due to a power-storage loss, or other cost increases. Therefore, there is a problem in that the operation plan created by the technique described in Patent Literature 1 may not minimize the actual power procurement cost.

The present invention has been achieved to solve the above problems, and an object of the present invention is to provide a supply-demand control device, a charge-discharge control device, a power storage device, a supply-demand control system, and a supply-demand control method that can reduce the power procurement cost.

Solution to Problem

To solve the above problem and achieve an object, there is provided a supply-demand control device according to the present invention connected through a communication network to a charge-discharge control device to control charge and discharge of a power storage device connected to a power distribution line in a power distribution system managed by a community, the supply-demand control device including: a planned load and power-generation-amount estimation unit to estimate a load and a power generation amount within the power distribution system for a future given period as a planned load and power generation amount; a first-evaluation-function calculation unit to calculate a value of a first evaluation function, which is a sum of a power purchase cost, a natural-discharge loss cost, a storage-battery life-span cost, a power-transmission loss cost, and a charge-discharge loss cost, for a future given period based on the planned load and power generation amount, a charge-discharge command amount for the charge-discharge control device to control charge and discharge of the power storage device, and a power storage amount in the power storage device; a planned charge-discharge command calculation unit to calculate a charge-discharge command amount based on a value of the first evaluation function; and a power-purchase plan output unit to create a power purchase plan based on the charge-discharge command.

Advantageous Effects of Invention

According to the present invention, it is possible to reduce the power procurement cost.

DESCRIPTION OF EMBODIMENTS

Exemplary embodiments of a supply-demand control device, a charge-discharge control device, a power storage device, a supply-demand control system, and a supply-demand control method according to the present invention will be explained below in detail with reference to the accompanying drawings. The present invention is not limited to the embodiments.

Embodiment

Figure 1:
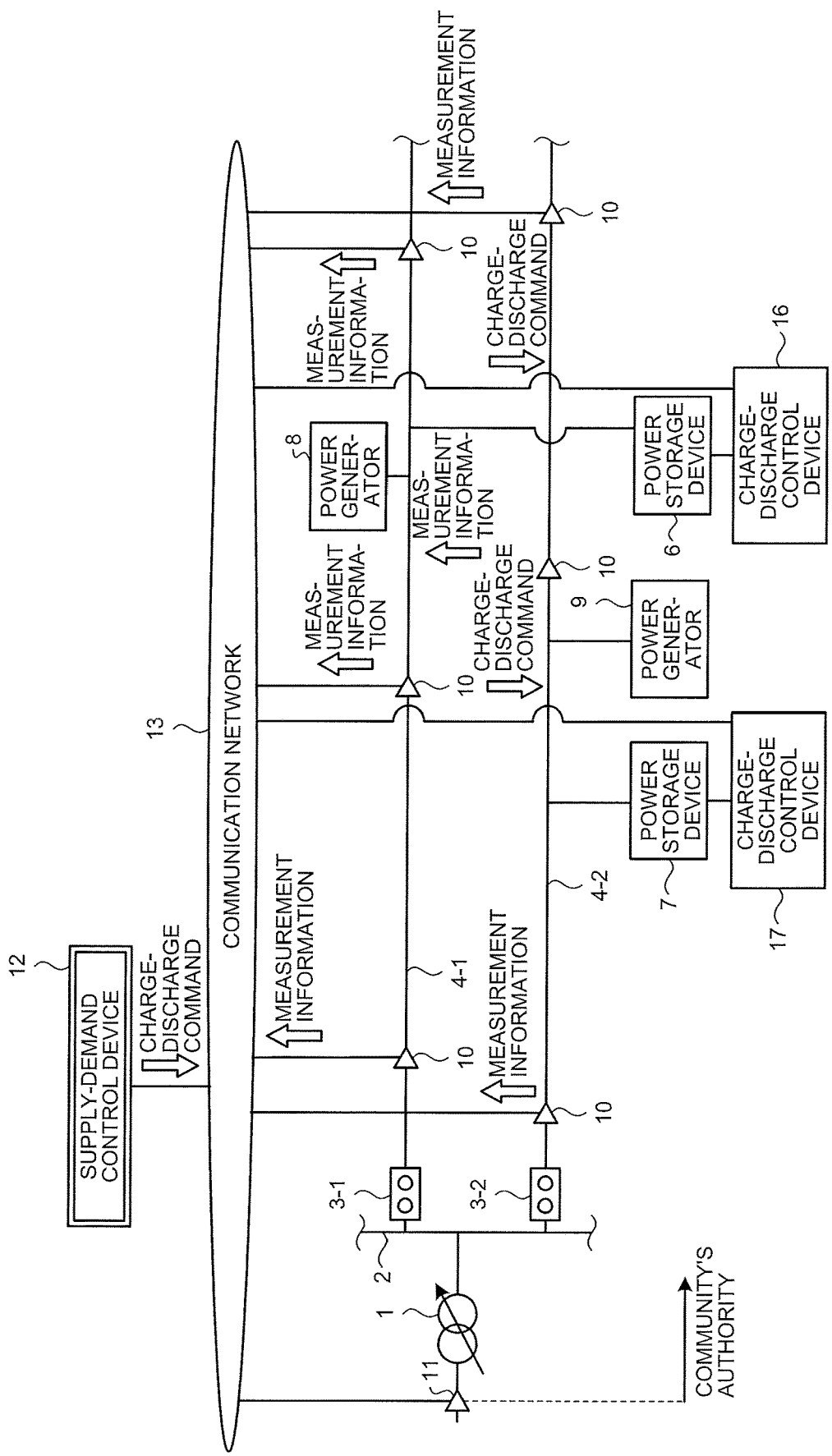
FIG. 1 is a diagram illustrating a configuration example of a supply-demand control system according to the present invention.

FIG. 1 is a diagram illustrating a configuration example of a supply-demand control system according to the present invention. In FIG. 1, a voltage control apparatus 1 is an LRT (Load Ratio Control Transformer: on-load tap changer transformer) that serves as a power distribution transformer. On the secondary side of the voltage control apparatus 1, a busbar 2 is connected. For example, two power distribution lines 4-1 and 4-2 are connected to the busbar 2 in parallel to each other.

The supply-demand control system according to the present embodiment is a system that controls the supply and demand of power in a community such as a smart community that manages power in the entire community. A measurement device 11 in FIG. 1 is provided at the location of the boundary between an area managed under the community and an area managed under the electric-power provider. The measurement device 11 measures power to be input to this community, and power to be output from this community.

The power distribution line 4-1 is connected at its one end to the busbar 2 through a breaker 3-1. At multiple points on the power distribution line 4-1, voltage and power-flow measurement devices 10 are respectively provided. Each of the voltage and power-flow measurement devices 10 measures a voltage and a power flow on the power distribution line 4-1. That is, each of the voltage and power-flow measurement devices 10 is connected to the power distribution line 4-1, measures a voltage and a power flow at the connection point, and outputs the measurement value as measurement information. The voltage and power-flow measurement devices 10 measure a voltage and a power flow, for example, in a given cycle (per second, for example), and transmit the average value of measurement results for a predetermined time (one minute, for example) as measurement information. The voltage and power-flow measurement devices 10 have a communication function, and are connected to a communication network 13. The voltage and power-flow measurement devices 10 periodically transmit the measurement information to a supply-demand control device 12 through the communication network 13, for example.

The power distribution line 4-2 is connected at its one end to the busbar 2 through a breaker 3-2. At multiple points on the power distribution line 4-2, the voltage and power-flow measurement devices 10 are respectively provided, each of which measures a voltage and a power flow on the power distribution line 4-2.

While the communication network 13 is the Internet, for example, it is also possible that the communication network 13 is a dedicated-line network. There are no particular limitations on the form of the communication network 13. In FIG. 1, the configuration of the supply-demand control system, in which the voltage and power-flow measurement devices 10 are included, is described as an example. However, it is permitted that the supply-demand control system does not include the voltage and power-flow measurement devices 10.

A power generator 8 and a power storage device 6 are connected to the power distribution line 4-1. Further, a power generator 9 and a power storage device 7 are connected to the power distribution line 4-2. The power storage device 6 is connected to a charge-discharge control device 16. The power storage device 7 is connected to a charge-discharge control device 17. The charge-discharge control devices 16 and 17 are connected to the supply-demand control device 12 through the communication network 13. Based on a charge-discharge command from the supply-demand control device 12, the charge-discharge control devices 16 and 17 control charge and discharge of the power storage devices 6 and 7, respectively. FIG. 1 illustrates a configuration example in which the charge-discharge control device 16 and the power storage device 6 are provided separately from each other. However, it is also possible that the charge-discharge control device 16 and the power storage device 6 are integrated into a single power storage device. Similarly to the above, it is also possible that the charge-discharge control device 17 and the power storage device 7 are integrated with each other. The configuration in FIG. 1 is merely an example. The number of power generators and the number of power storage devices connected to each power distribution line are not limited to the example in FIG. 1. Although not illustrated in FIG. 1, a load is connected to each of the power distribution lines 4-1 and 4-2.

The supply-demand control device 12 draws up a power purchase plan in a community, decides a command value for charge and discharge of the power storage devices 6 and 7 within the community, and transmits the decided command value as a charge-discharge command to the charge-discharge control devices 16 and 17 via the communication network 13. It is permitted that the supply-demand control device 12 is installed inside the community, or installed outside the community.

Figure 2:
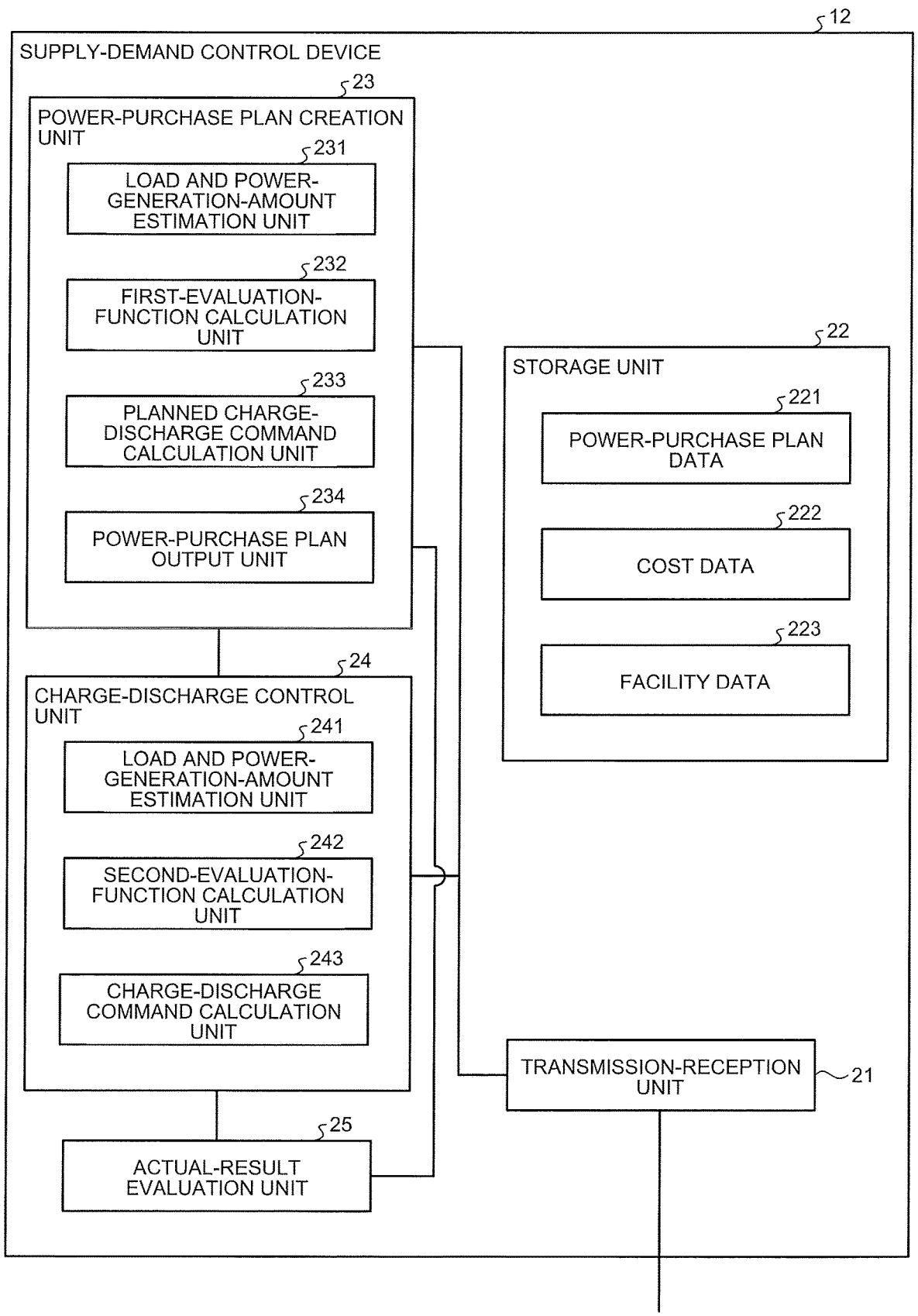
FIG. 2 is a diagram illustrating a configuration example of a supply-demand control device.

FIG. 2 is a diagram illustrating a configuration example of the supply-demand control device 12. As illustrated in FIG. 2, the supply-demand control device 12 includes a transmission-reception unit 21, a storage unit 22, a power-purchase plan creation unit 23, a charge-discharge control unit 24, and an actual-result evaluation unit 25. The power-purchase plan creation unit 23 includes a load and power-generation-amount estimation unit (planned load and power-generation-amount estimation unit) 231, a first-evaluation-function calculation unit 232, a planned charge-discharge command calculation unit 233, and a power-purchase plan output unit 234. The charge-discharge control unit 24 includes a load and power-generation-amount estimation unit 241, a second-evaluation-function calculation unit 242, and a charge-discharge command calculation unit 243. In the storage unit 22, power-purchase plan data 221, cost data 222, and facility data 223 are stored, which are created by the power-purchase plan creation unit 23. The power-purchase plan data 221 is stored as data of a power purchase plan created by the power-purchase plan creation unit 23. The cost data 222 is the electric rate in each time period charged by each electric-power provider and/or a parameter for calculating the life-span-related cost for each of the power storage devices 6 and 7, that is, the cost data 222 is data for calculating the cost. Generally, the electric rate differs depending on the time period, and the electric rate also differs depending on the electric-power provider. In this example, it is assumed that an electric-power provider can be selected every 30 minutes, and the electric rate charged by each electric-power provider per 30 minutes is stored in the cost data 222. The facility data 223 is information (such as a rated capacity) related to each facility (the power generators 8 and 9, the load (not illustrated), and the like) within a power distribution system managed by the community, and/or is data related to the configuration within the power distribution system such as a resistance value to be used for calculating a power-transmission loss described later.

Figure 3:
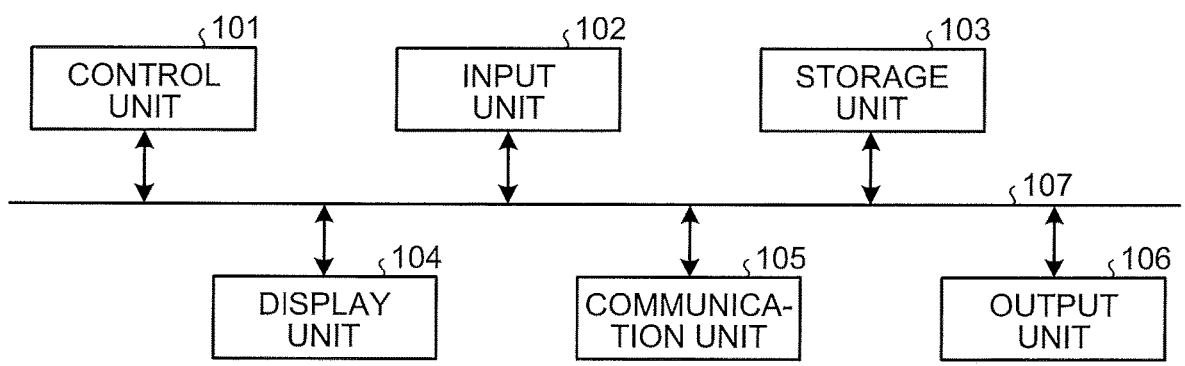
FIG. 3 is a diagram illustrating a configuration example of a calculator system that functions as the supply-demand control device.

The supply-demand control device 12 is specifically a calculator system (a computer). By executing a supply-demand control program in this calculator system, the calculator system functions as the supply-demand control device 12. FIG. 3 is a diagram illustrating a configuration example of the calculator system that functions as the supply-demand control device 12 according to the present embodiment. As illustrated in FIG. 3, this calculator system includes a control unit 101, an input unit 102, a storage unit 103, a display unit 104, a communication unit 105, and an output unit 106. These units are connected to each other through a system bus 107.

In FIG. 3, the control unit 101 is a CPU (Central Processing Unit), for example, and executes a supply-demand control program according to the present embodiment. The input unit 102 is constituted by a keyboard and a mouse, for example. A user of the calculator system uses the input unit 102 to input various types of information. The storage unit 103 includes various types of memories such as a RAM (Random Access Memory) and a ROM (Read Only Memory), and a storage device such as a hard disk. The storage unit 103 stores therein a program to be executed by the above control unit 101, necessary data obtained in the course of processing, and other data. The storage unit 103 is also used as a storage area for temporarily storing a program. The display unit 104 is constituted by an LCD (a liquid crystal display panel) and other elements, and displays various types of screens to a user of the calculator system. The communication unit 105 has a function of connecting to a network such as a LAN (Local Area Network), transmits a charge-discharge command to the charge-discharge control devices 16 and 17, and receives measurement values from the voltage and power-flow measurement devices 10 and the measurement device 11. The output unit 106 is constituted by a printer or the like, and has a function of outputting a processing result to outside. FIG. 3 is merely an example, and the configuration of the calculator system is not limited to the example in FIG. 3. For example, it is permitted that the calculator system does not include the output unit 106.

There is described an example of the operation of the calculator system until the supply-demand control program according to the present invention is brought into an executable state. In the calculator system with the above configuration, the supply-demand control program is installed in the storage unit 103 from, for example, a CD (Compact Disc)-ROM/DVD (Digital Versatile Disc)-ROM having been set in the CD-ROM/DVD-ROM drive (not illustrated). At the time of executing the supply-demand control program, the supply-demand control program read from the storage unit 103 is stored in a predetermined location of the storage unit 103. In this state, the control unit 101 performs the supply-demand control process in the present embodiment according to the program stored in the storage unit 103.

In the present embodiment, the CD-ROM/DVD-ROM is used as a storage medium to provide a program describing the demand-supply control process (the demand-supply control program). However, the present invention is not limited thereto. For example, in accordance with the configuration of the calculator system, the capacity of a program to be provided, and other factors, it is also possible to use a program provided by a transmission medium such as the Internet via the communication unit 105.

The power-purchase plan creation unit 23, the charge-discharge control unit 24, and the actual-result evaluation unit 25, which are illustrated in FIG. 2, are included in the control unit 101 in FIG. 3. The storage unit 22 in FIG. 2 is the storage unit 103 in FIG. 3. The transmission-reception unit 21 in FIG. 2 is included in the communication unit 105 in FIG. 3.

Figure 4:
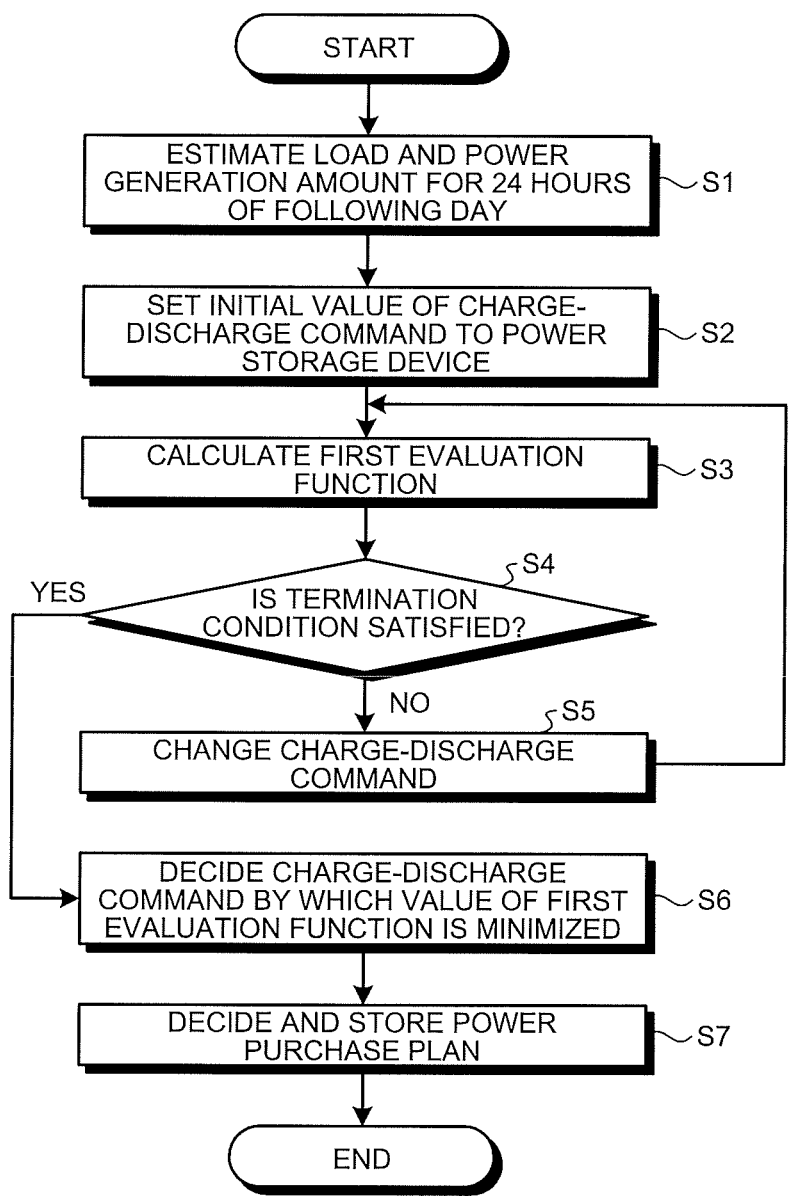
FIG. 4 is a flowchart illustrating an example of a procedure of a power-purchase plan creation process.

Next, the power-purchase plan creation process according to the present embodiment is described. FIG. 4 is a flowchart illustrating an example of a procedure of the power-purchase plan creation process according to the present embodiment. For the sake of simplicity of the descriptions, FIG. 4 illustrates an example in which the community purchases electricity from a single electric-power provider. As illustrated in FIG. 4, first the load and power-generation-amount estimation unit 231 estimates a future load/power-generation-amount distribution in a power distribution system, for example, every 30 minutes, for such as the following day (Step S1). In this example, the load and power-generation-amount estimation unit 231 decides a power purchase plan on a daily basis, and at a fixed time every day, for example, performs the power-purchase plan creation process for a given period (for example, 24 hours) of the following day. Furthermore, the electric rate is decided per 30 minutes in this example. The load and power-generation-amount estimation unit 231 calculates, as a power purchase plan, the power purchase amount per 30 minutes, and an electric-power provider that serves as an electricity supplier in the corresponding time period. The given period for a power purchase plan is not have to be 24 hours (one day). Further, the unit time for deciding the power purchase amount for a power purchase plan is not limited to 30 minutes.

There are no particular restrictions on the method for estimating a load/power-generation-amount distribution. For example, the load and power-generation-amount estimation unit 231 estimates a load/power-generation-amount distribution based on the facility data 223, estimated values of the solar-light power-generation amount based on the weather forecast, and other factors.

Next, the planned charge-discharge command calculation unit 233 sets the initial value of the command amount of a charge-discharge command (a charge-discharge command per 30 minutes for 24 hours for the following day) to the power storage devices 6 and 7 (the initial value of the command amount in each time period), and sets the initial value of the power storage amount (the power storage amount at the time of starting point of the power purchase plan) (Step S2). The initial value of the charge-discharge command amount can be set to any value because the charge-discharge command amount is sequentially changed in finding an optimal solution. Any value can be used as the initial value of the power storage amount. For example, it is also possible that the planned charge-discharge command calculation unit 233 obtains and holds therein the power storage amount at the last point in time in the power purchase plan calculated immediately before (one day before) the power purchase plan being created, and uses the value held therein as the initial value of the power storage amount. For another example, it is possible that the charge-discharge control devices 16 and 17 are configured to transmit measurement information related to the power storage amount, such as SOC (State Of Charge) of the power storage devices 6 and 7, to the supply-demand control device 12 via the communication network 13, and the supply-demand control device 12 sets the initial value of the power storage amount based on the SOC and other information received from these charge-discharge control devices 16 and 17.

The first-evaluation-function calculation unit 232 calculates a first evaluation function described later (Step S3). The planned charge-discharge command calculation unit 233 performs power-flow calculation using a predetermined optimal-solution calculation algorithm to calculate a charge-discharge command (an optimal solution) by which the value of the first evaluation function is minimized. The planned charge-discharge command calculation unit 233 determines whether a termination condition in the optimal-solution calculation algorithm is satisfied (Step S4). When the termination condition is not satisfied (NO at Step S4), the planned charge-discharge command calculation unit 233 changes the charge-discharge command amount based on the optimal-solution calculation algorithm (Step S5), and then the process returns to Step S3. For example, as the termination condition, a condition of whether a search has been performed for a predetermined number of times can be used.

When the termination condition is satisfied (YES at Step S4), the planned charge-discharge command calculation unit 233 decides the charge-discharge command amount, by which the value of the first evaluation function is minimized, as a planned charge-discharge command amount (Step S6). The power-purchase plan output unit 234 then decides a power purchase plan based on the planned charge-discharge command, and stores the decided plan as the power-purchase plan data 221 in the storage unit 22 (Step S7).

In the case of taking into account the electric rates of a plurality of electric-power providers, the power-purchase plan output unit 234 finds in advance an electric-power provider that offers the cheapest electric rate in each unit time (30 minutes), for example, and can use this result to calculate the first evaluation function described later. For another example, it is possible that in the optimal-solution calculation algorithm described above, not only a charge-discharge command, but also a unit price per unit time charged by each electric-power provider, are included as variables, so as to find an optimal solution (a charge-discharge command, and an electric-power provider for each unit time) by which the first evaluation function is minimized.

Next, the first evaluation function is described. In the present embodiment, the power procurement cost is accurately evaluated by including a cost increase due to a reduction in life-span of a power storage device within the community, a cost increase due to a power-storage loss, and a cost increase due to a power-transmission loss in the power distribution system, thereby creating a power purchase plan with the actual power procurement cost reduced. The first evaluation function is used in order to evaluate this power procurement cost. In the present embodiment, the first evaluation function represents the cost, and the value of the function is shown in yen, for example. The currency unit is not limited to yen.

A first evaluation function F1 is defined as the following equation (1).

$$F1 = C_B + C_{NA} + C_L + C_{Df} + C_{CB} + C_{CC} + C_{FIB} \quad (1)$$

$C_B$: Power purchase cost
$C_{NA}$: Natural-discharge loss cost
$C_L$: Storage-battery life-span cost
$C_{Df}$: Power-transmission loss cost
$C_{CB}$: Charge-discharge loss cost
$C_{CC}$: Power storage device's cooling power/control power cost
$C_{FIB}$: Penalty cost in which actual result of imbalance penalty described later is reflected
It is possible that $C_{FIB}$ is not taken into account.

$C_B$ (power purchase cost) is the electric rate for purchasing electricity from an electric-power provider, and can be expressed as the following equation (2). In the case of selecting an electric-power provider in each time period, the unit price of the electric rate (per 30 minutes) charged by the electric-power provider that corresponds to each time period is used in the following equation (2). The unit price of the electric rate (per 30 minutes) is stored as the cost data 222 in the storage unit 22.

$$C_B = \Sigma_t (\text{unit price of electric rate (per 30 minutes)} \times \text{power purchase amount (per 30 minutes)}) \quad (2)$$

$\Sigma_t$ in the above equation (2) represents the sum for 24 hours.

The power purchase amount can be decided by the following equation (3).

Power purchase amount = Σ load − Σ power generation amount + Σ charge amount − Σ discharge amount + Σ power-transmission loss (3)

Σ in the above equation (3) represents the sum for the number of corresponding facilities. Therefore, each time the charge-discharge command amount (the charge-discharge amount) is changed, the power purchase amount per 30 minutes can be calculated based on the above equation (3).

Figure 5:
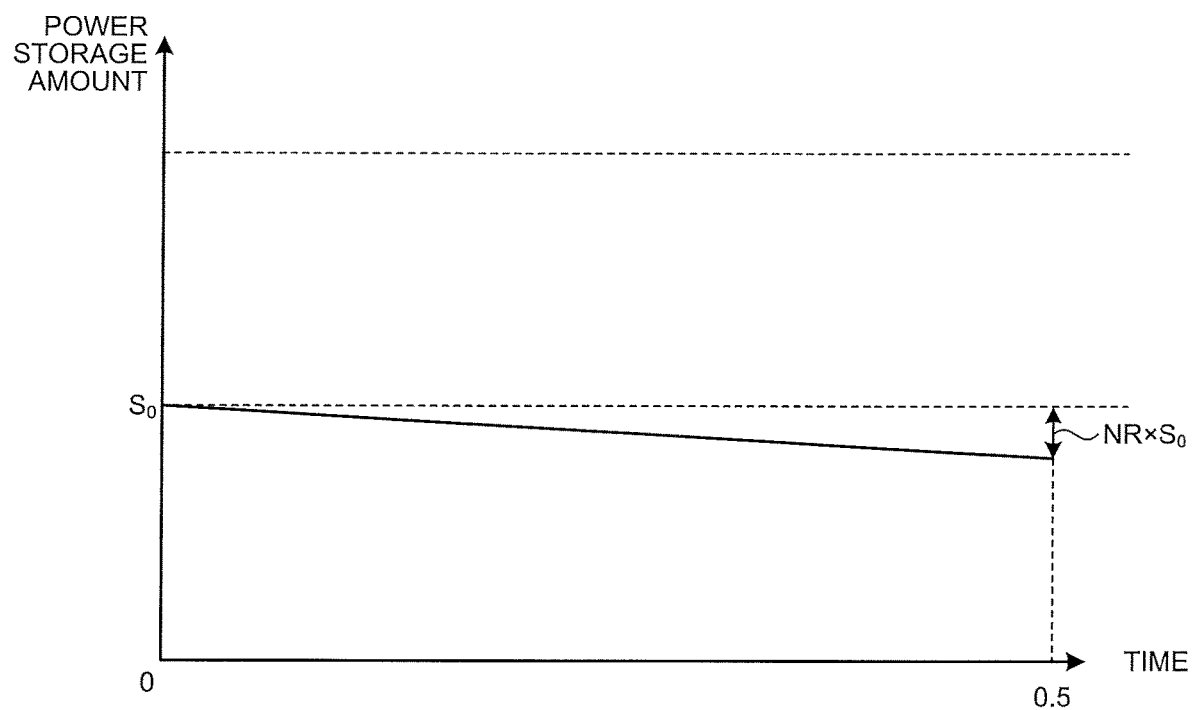
FIG. 5 is an explanatory diagram of a natural discharge loss.

$C_{NA}$ (natural-discharge loss cost) is a cost corresponding to the power storage amount (a loss) decreased due to natural discharge from the power storage device. The natural discharge loss is a function that depends on the power storage amount in each power storage device. In this example, the natural discharge loss is assumed to be proportional to the power storage amount in each power storage device. FIG. 5 is an explanatory diagram of the natural discharge loss. In FIG. 5, the horizontal axis represents time, and the vertical axis represents the power storage amount. The natural discharge loss can be expressed as the following equation (4), where the rate of decrease in power storage amount per unit time (30 minutes in this example), which is due to natural discharge (hereinafter, referred to as "natural discharge rate"), is represented as NR, and the power storage amount is represented as $S_0$.

$$S_{NA} = NR \times S_0 \quad (4)$$

In the case where there are a plurality of power storage devices in the community, when the natural discharge rate of the i-th power storage device is represented as NR(i), and the power storage amount in the i-th power storage device at the time "t" is represented as $S_0$ (i, t), then $C_{NA}$ can be expressed as the following equation (5). The natural discharge rate NR(i) of each power storage device is stored as the facility data 223 or the cost data 222 in the storage unit 22.

$$C_{NA} = \Sigma_t \Sigma_i (\alpha \times NR(i) \times S_0(i,t)) \quad (5)$$

In the above equation (5), $\Sigma_i$ represents the sum for the number of power storage devices within the community, and $\Sigma_t$ represents the sum for 24 hours. "α" is a proportionality constant for converting the natural discharge loss into a cost. For example, the unit price of the electric rate (per 30 minutes) can be used as "α". However, it is also possible that the unit price of the electric rate (per 30 minutes) is not directly used, but an average of the unit price of the electric rate (per 30 minutes) for 24 hours is used.

$C_L$ (storage-battery life-span cost) is a cost that increases as the life-span of the power storage device decreases. In this example, the two following types of costs are taken into account as $C_L$. The method for calculating the storage-battery life-span cost is not limited to the method described below. It is also possible that either one of (a) and (b) described below is taken into account, or a cost other than (a) and (b) is taken into account.

(a) Total-charge-discharge-amount dependent cost:
As a power storage device is repeatedly charged and discharged, its maximum charge power gradually decreases (degradation of the power storage device). Eventually, a need arises for replacing the power storage device, resulting in a large amount of cost. In this example, a cost $C_{L1}$ that is proportional to the charge command amount is obtained for respective power storage devices by the following equation (6). $\beta(i)$ is a proportionality constant of the i-th power storage device. $\beta(i)$ is decided in advance according to the price, the average life-span of the power storage device, or the like, and is stored as the cost data 222 in the storage unit 22.

$$C_{L1}=\Sigma_t\Sigma_i\{\beta(i)\times\text{charge command amount (per 30 minutes)}\} \quad (6)$$

(b) High-voltage/charge-discharge-rate dependent cost:
In a nearly full-charge state, a storage-battery cell in a power storage device has a high voltage. As the charge-discharge rate is high, degradation of the storage battery is accelerated. In this example, a cost $C_{L2}$ that is proportional to the absolute value of "power storage amount×charge-discharge command amount" is obtained for respective power storage devices by the following equation (7). $\gamma(i)$ is a proportionality constant of the i-th power storage device. $\gamma(i)$ is decided in advance according to the price, the average life-span of the power storage device, or the like, and is stored as the cost data 222 in the storage unit 22.

$$C_{L2}=\Sigma_t\Sigma_i\{\gamma(i)\times|\text{charge-discharge command amount (per 30 minutes)}|\times\text{power storage amount}\} \quad (7)$$

$C_L$ can be expressed as the following equation (8) by using $C_{L1}$ and $C_{L2}$ described above.

$$C_L=C_{L1}+C_{L2} \quad (8)$$

$C_{DI}$ (power-transmission loss cost) is a cost that corresponds to a power-transmission loss caused within the community. The power-transmission loss takes into account a loss on the power distribution line, and a loss in the transformer. The value of a current, to be used for calculating the power-transmission loss, is calculated by simulating the power transmission based on the load amount/power generation amount estimated by the load and power-generation-amount estimation unit 231, and based on the charge-discharge command, and other factors. $C_{DI}$ can be expressed as the following equation (9). "I" represents a current. R(k) represents a resistance value of the k-th power distribution line. R(j) represents a resistance value of the j-th transformer. R(k) and R(j) are stored as the facility data 223 in the storage unit 22.

$$C_{DI}=\alpha\times\Sigma_t(\Sigma_k\text{ loss on power distribution line}+\Sigma_j\text{ transformer loss})$$

Loss on power distribution line $=I^2\times R(k)$

Transformer loss $=I^2\times R(j) \quad (9)$ $\Sigma_k$ represents the sum for the number of power distribution lines. $\Sigma_j$ represents the sum for the number of transformers. Further, "$\alpha$" is a proportionality constant for converting the power-transmission loss into a cost, and is identical to the proportionality constant in the case of converting the natural discharge loss into a cost. In this example, the proportionality constant in the case of converting the power-transmission loss into a cost is identical to the proportionality constant in the case of converting the natural discharge loss into a cost. However, it is also possible that values different to each other are set to the respective proportionality constants.

Figure 6:
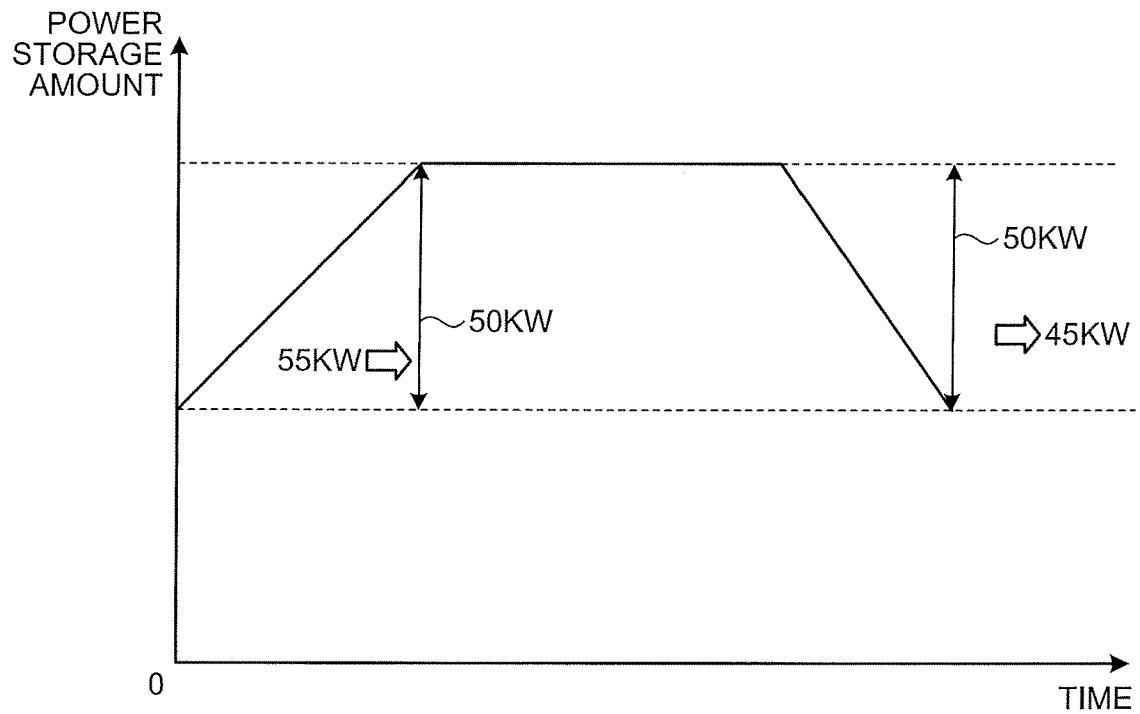
FIG. 6 is an explanatory diagram of a charge-discharge loss.

$C_{CB}$ (charge-discharge loss cost) is a cost that corresponds to a charge-discharge loss in each power storage device. The charge-discharge loss corresponds to the difference between power required for charging each power storage device, and power obtained when power is drawn from each power storage device. FIG. 6 is an explanatory diagram of the charge-discharge loss. In FIG. 6, the horizontal axis represents time, and the vertical axis represents the power storage amount. As described previously, the natural discharge loss is separately taken into account, and is therefore regarded as 0 in FIG. 6. For example, as illustrated in FIG. 6, it is assumed that a charge command is transmitted to the charge-discharge control device 16 that controls the power storage device 6, so as to supply 55 KW charge power to the storage battery in the power storage device 6. It is assumed that while the charge-discharge control device 16 supplies 55 KW charge power to the storage battery, the amount of power stored in the power storage device 6 is 50 KW. Thereafter, it is assumed that the charge-discharge control device 16 receives a discharge command and 45 KW power is drawn from the power storage device 6 in response to the discharge command, and the power storage amount in the power storage device 6 is decreased by 50 KW. In this case, the difference between the power instructed by the charge command and the power actually draw is 10 KW (=55 KW−45 KW) and the difference is a charge-discharge loss.

The charge-discharge loss is assumed to be proportional to the charge command value (in the example in FIG. 6, 55 KW power required for charging). This proportionality constant is defined as "$\varepsilon$" (for example, $\varepsilon=0.2$ (20%)). It is assumed that "$\varepsilon$" is obtained for each power storage device in advance. When this proportionality constant of the i-th power storage device is represented as $\varepsilon(i)$, $C_{CB}$ can be expressed as the following equation (10) based on the above assumption.

$$C_{CB}=\alpha\times\Sigma_t\Sigma_i\{\varepsilon(i)\times\text{charge command amount}\} \quad (10)$$

"$\varepsilon$" is a proportionality constant for converting the charge-discharge loss into a cost, and is identical to the proportionality constant for converting the natural discharge loss into a cost. In this example, the proportionality constant for converting the charge-discharge loss into a cost is identical to the proportionality constant in the case of converting the natural discharge loss into a cost. However, it is also possible that values different to each other are set to the respective proportionality constants.

$C_{cc}$ is a cost required for cooling power/control power. At a high temperature, degradation of a storage battery is accelerated in a power storage device. Therefore, it is general for a large-sized storage battery to include a cooling facility (such as a fan). In general, the cooling facility uses power for cooling. The control power of the storage battery also uses power. For example, $C_{cc}$ can be defined as a function of the charge-discharge command amount. As an example, $C_{cc}$ is calculated by the following equation (11) as a value that is proportional to the absolute value of the charge-discharge command amount. $\phi(i)$ is a proportionality constant of the i-th power storage device.

$$C_{CC}=\alpha\times\Sigma_t\Sigma_i\{(\phi(i)\times|\text{charge-discharge command amount}|\} \quad (11)$$

"$\alpha$" is a proportionality constant for converting the charge-discharge loss into a cost, and is identical to the proportionality constant for converting the natural discharge loss into a cost. In this example, the proportionality constant for converting the charge-discharge loss into $C_{cc}$ is identical to the proportionality constant for converting the natural discharge loss into a cost. However, it is also permitted that values different to each other are set to the respective proportionality constants. It is possible that $C_{cc}$ is not taken into account in the case where cooling is not performed. Alternatively, it is possible that an influence of cooling power/control power is included in other items such as $C_{CB}$, and therefore $C_{cc}$ is not taken into account.

$C_{FIB}$ is calculated as a cost that is reflected to the power purchase plan by using a result of the statistical processing that is performed on a penalty incurred based on the difference between the power purchase plan and the actual result of power purchase amount. Details of $C_{FIB}$ are described later.

Figure 7:
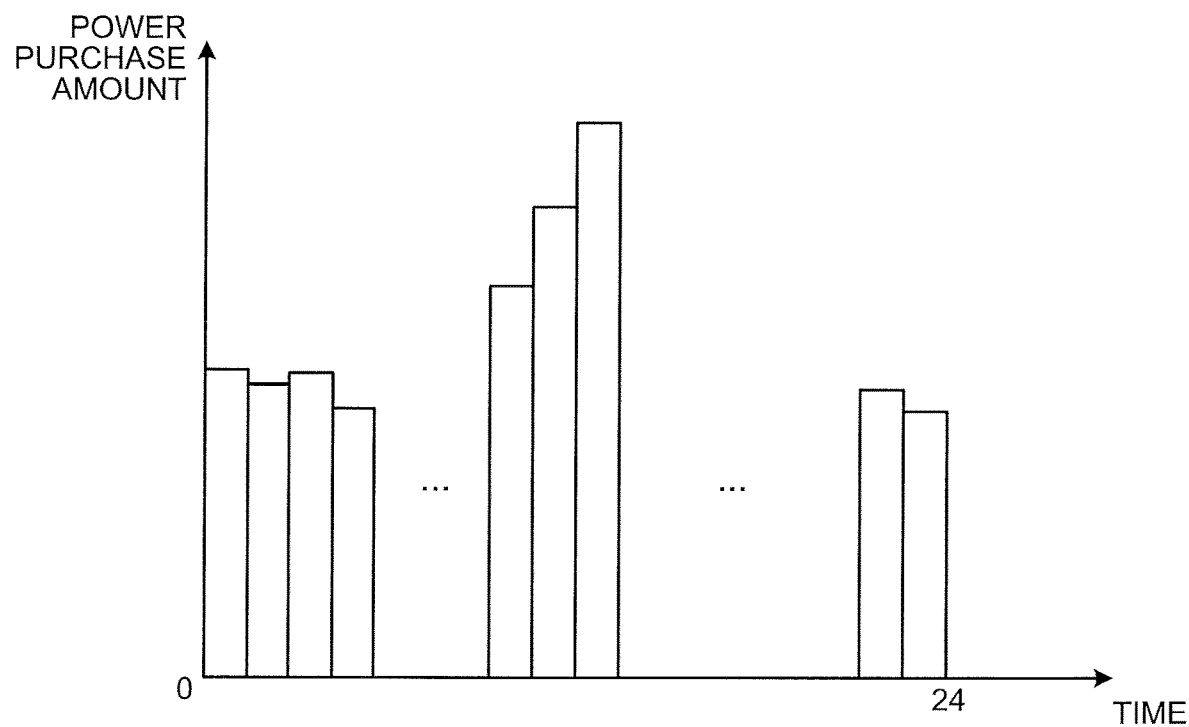
FIG. 7 is a conceptual diagram illustrating an example of a power purchase plan.

A power purchase plan is created according to the procedure described above. FIG. 7 is a conceptual diagram illustrating an example of the power purchase plan. In FIG. 7, the horizontal axis represents time, and the vertical axis represents the power purchase amount. As illustrated in FIG. 7, the power purchase plan defines the power purchase amount per 30 minutes for 24 hours. In the case where an electric-power provider is selected in each time period, an electric-power provider in each time period is also decided as a power purchase plan. This power purchase plan is presented to the electric-power provider. Assuming that the community uses electricity according to this power purchase plan, the electric-power provider draws up an electricity supply plan for the following day.

Next, charge-discharge control according to the present embodiment is described. In the present embodiment, a charge-discharge command, by which the function value of a second evaluation function described later is minimized, is obtained for the next 24 hours from the present time, and the obtained charge-discharge command is transmitted to the charge-discharge control devices 16 and 17. Similarly to the first evaluation function, the second evaluation function is an evaluation function that represents the power procurement cost. The second evaluation function is different from the first evaluation function in that the second evaluation function takes into account a penalty incurred by the difference between the power purchase plan presented to the electric-power provider, and the actual power usage.

Figure 8:
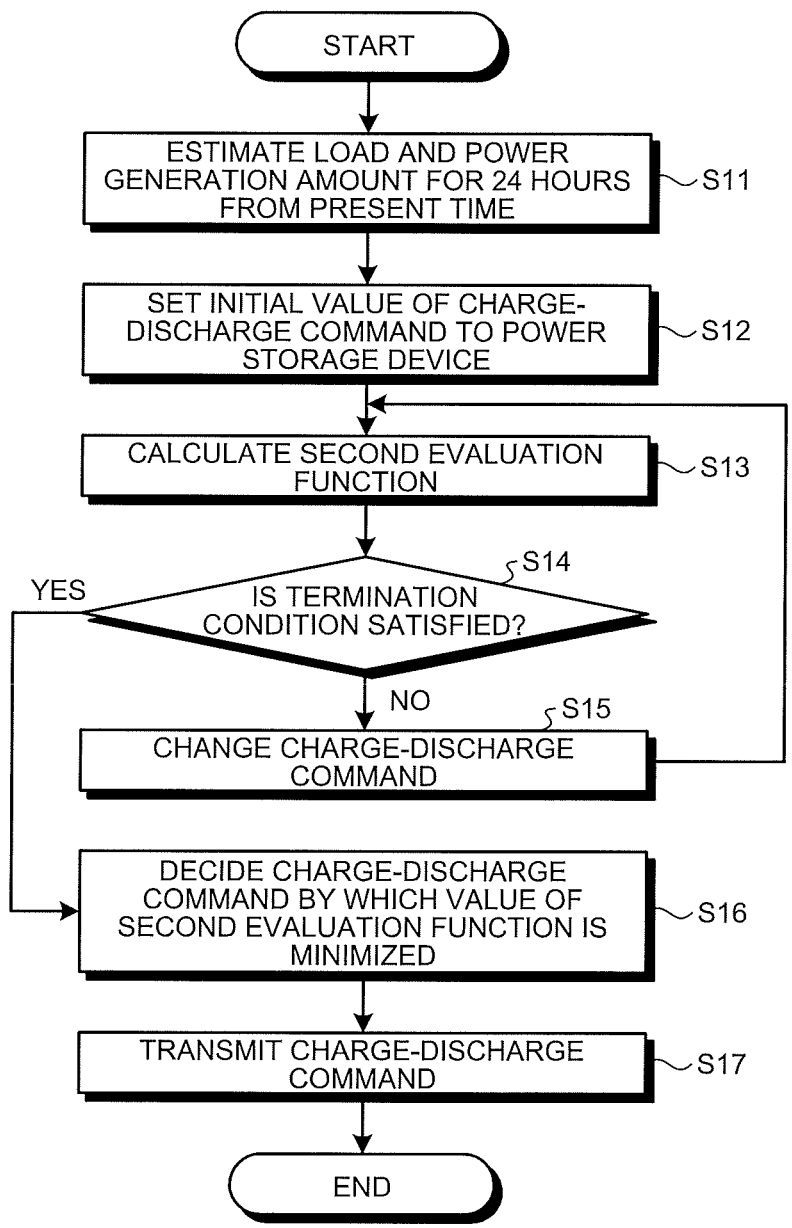
FIG. 8 is a flowchart illustrating an example of a procedure of a charge-discharge control process.

FIG. 8 is a flowchart illustrating an example of a procedure of the charge-discharge control process according to the present embodiment. The charge-discharge control unit 24 performs the process illustrated in FIG. 8 in a given cycle (for example, 30 minutes). For the sake of simplicity of the descriptions, FIG. 8 illustrates an example in which a community purchases electricity from a single electric-power provider, similarly to the example in FIG. 4. In the configuration example in FIG. 2, the power-purchase plan creation unit 23 and the charge-discharge control unit 24 are illustrated as separate constituent elements. However, the load and power-generation-amount estimation unit 231 and the load and power-generation-amount estimation unit 241 individually perform a similar process. The first-evaluation-function calculation unit 232 and the second-evaluation-function calculation unit 242 individually perform a similar process. The planned charge-discharge command calculation unit 233 and the charge-discharge command calculation unit 243 individually perform a similar process. Therefore, it is also possible, for example, that the load and power-generation-amount estimation unit 231 and the load and power-generation-amount estimation unit 241 are configured as a single processing unit, and arguments are changed to switch between the processing for creating a power purchase plan, and the charge-discharge control process. The same applies to the first-evaluation-function calculation unit 232 and the second-evaluation-function calculation unit 242. The same also applies to the planned charge-discharge command calculation unit 233 and the charge-discharge command calculation unit 243.

As illustrated in FIG. 8, first the load and power-generation-amount estimation unit 241 estimates a load amount/ power-generation-amount distribution in a power distribution system, for example per 30 minutes, for a given period (for example, 24 hours) from the present time (Step S11). Step S11 is different from Step S1 in FIG. 4 in that the estimated load/power-generation-amount distribution is affected by the latest information such as weather information. Further, it is possible that the estimated load/power-generation-amount distribution is corrected based on the measurement information received from the voltage and power-flow measurement devices 10 and the measurement device 11.

Next, the charge-discharge command calculation unit 243 sets the initial value of the charge-discharge command amount to the power storage devices 6 and 7 (for 24 hours from the present time), and sets the initial value of the power storage amount (the power storage amount at the present time) in the power storage devices 6 and 7 (Step S12). Any value can be used as the initial value of the power storage amount. For example, it is also possible that the charge-discharge control devices 16 and 17 are configured to transmit SOC of the power storage devices 6 and 7 to the supply-demand control device 12 via the communication network 13, and the supply-demand control device 12 sets the initial value of the power storage amount based on the SOC received from these charge-discharge control devices 16 and 17.

The second-evaluation-function calculation unit 242 calculates the second evaluation function described later (Step S13). The charge-discharge command calculation unit 243 performs power-flow calculation using a predetermined optimal-solution calculation algorithm to calculate a charge-discharge command amount by which the value of the second evaluation function is minimized. The charge-discharge command calculation unit 243 determines whether a termination condition in the optimal-solution calculation algorithm is satisfied (Step S14). When the termination condition is not satisfied (NO at Step S14), the charge-discharge command calculation unit 243 changes the charge-discharge command amount based on the optimal-solution calculation algorithm (Step S15), and then the process returns to Step S13.

When the termination condition is satisfied (YES at Step S14), the charge-discharge command calculation unit 243 decides the charge-discharge command amount, by which the value of the second evaluation function is minimized (Step S16). The transmission-reception unit 21 transmits the decided charge-discharge command to each of the charge-discharge control devices 16 and 17 (Step S17).

Next, the second evaluation function is described. A second evaluation function F2 is defined as the following equation (12).

$$F2 = C_B' + C_{NA} + C_L + C_{DI} + C_{CB} + C_{CC} + C_{IB} \quad (12)$$

$C_B'$: Planned power purchase cost
$C_{NA}$: Natural-discharge loss cost
$C_L$: Storage-battery life-span cost
$C_{DI}$: Power-transmission loss cost
$C_{CB}$: Charge-discharge loss cost
$C_{CC}$: Power storage device cooling power/control power cost
$C_{IB}$: Imbalance penalty In comparison with the first evaluation function expressed as the above equation (1), $C_B$ is replaced with $C_B'$, and $C_{IB}$ is added in the second evaluation function expressed as the equation (12). Except for these points, the first evaluation function and the second evaluation function are the same, except that the target calculation times differ (24 hours of the following day, or 24 hours from the present time). $C_{NA}$, $C_L$, $C_{DP}$, $C_{CB}$, and $C_{CC}$ are the same as those in the first evaluation function, and therefore the descriptions thereof are omitted.

$C_B{}'$ (planned power purchase cost) is a cost incurred when power is purchased according to the power purchase plan created on the previous day. Therefore, $C_B{}'$ (planned power purchase cost) is a fixed value determined based on the power purchase plan created on the previous day, and can be expressed as the following equation (13). The planned power purchase amount (per 30 minutes) is a power purchase amount per 30 minutes determined in the power purchase plan. $\Sigma_t$ represents the sum for 24 hours from the present time.

$$C_B{}' = \Sigma_t{}'(\text{unit price of electric rate (per 30 minutes)} \times \text{planned power purchase amount (30 minutes)}) \quad (13)$$

It is assumed that, as for $C_{IB}$ (imbalance penalty), when the actual power purchase amount is greater than the planned power purchase amount, this incurs a shortage penalty. It is also assumed that when the actual power purchase amount is smaller than the planned power purchase amount, this causes a redundancy penalty. As described above, the imbalance penalty is a penalty caused when there is a difference between the power purchase amount and the planned power purchase amount. In the case where only either the shortage penalty or the redundancy penalty is imposed, it is possible that the corresponding one of these penalties is only taken into account. Further, in the case where neither the shortage penalty nor the redundancy penalty is imposed, it is possible that $C_{IB}$ is not taken into account. In each time period, either the shortage penalty or the redundancy penalty is caused depending on which is greater, the actual power purchase amount (per 30 minutes) or the planned power purchase amount (per 30 minutes). $U_{PR}$ represents the unit price of the shortage penalty. $U_{PR}$ represents the unit price of the redundancy penalty. The actual power purchase amount is a power purchase amount assumed at the time of calculating the second evaluation function. Therefore, a penalty incurred in each time period (a shortage penalty or a redundancy penalty) $Ct_{IB}$ can be expressed as the following equation (14).

In a case of actual power purchase amount (per 30 minutes) ≥ planned power purchase amount (per 30 minutes):

$$Ct_{IB} = (\text{actual power purchase amount (per 30 minutes)} - \text{planned power purchase amount (per 30 minutes)}) \times U_{PS}$$

In a case of actual power purchase amount (per 30 minutes) < planned power purchase amount (per 30 minutes):

$$Ct_{IB} = (\text{planned power purchase amount (per 30 minutes)} - \text{actual power purchase amount (per 30 minutes)}) \times U_{PR} \quad (14)$$

Therefore, $C_{IB}$ can be expressed as the following equation (15).

$$C_{IB} = \Sigma_t Ct_{IB} \quad (15)$$

The actual power purchase amount is obtained based on the charge-discharge command based on the equation (3) in the same manner as at the time of creating a power purchase plan.

As described above, the second evaluation function is used to calculate a command value of the charge-discharge control command. This can reduce the power procurement cost. Further, as described below, the cost $C_{FIB}$ calculated based on the value of actual result of the imbalance penalty can be reflected when creating a power purchase plan. This can further reduce the power procurement cost.

The actual-result evaluation unit 25 accumulates, on a time period (30 minutes) basis, the difference (an absolute value) $\Delta P_1$ between the actual power purchase amount and the planned power purchase amount when a shortage penalty is caused for a plurality of days (for example, for one month), and obtains an average value $W_1$ of $\Delta P_1$ accumulated on a time period basis. The maximum value of the power storage amount in a power storage device is represented as $S_{MAX}$. The value, which is calculated by subtracting $W_1$ from $S_{MAX}$, is obtained as a first reference power-storage amount. Similarly to the above, the actual-result evaluation unit 25 accumulates, on a time period (30 minutes) basis, the difference (an absolute value) $\Delta P_2$ between the planned power purchase amount and the actual power purchase amount when a redundancy penalty is caused for a plurality of days (for example, for one month), and obtains an average value $W_2$ of $\Delta P_2$ accumulated on a time period basis. The value that is calculated by adding $W_2$ to the minimum value (that is, 0) of the power storage amount in a power storage device is obtained as a second reference power-storage amount.

Figure 9:
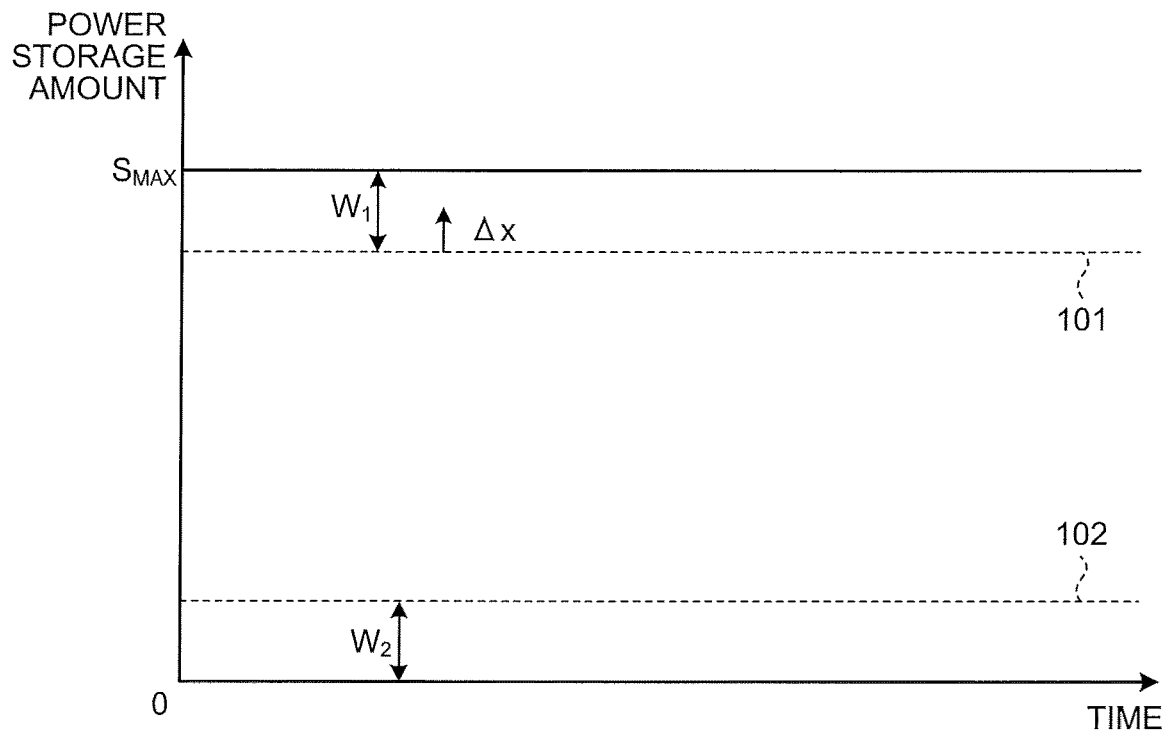
FIG. 9 is a diagram illustrating an example of a first reference power-storage amount and a second reference power-storage amount in a certain time period.

FIG. 9 is a diagram illustrating an example of a first reference power-storage amount 101 and a second reference power-storage amount 102 in a certain time period. At Step S3 in the power-purchase plan creation process illustrated in FIG. 4, when a power storage amount $S_{cal}$ estimated at that time point is equal to or greater than the first reference power-storage amount 101, the value that is calculated by subtracting the first reference power-storage amount 101 from the power storage amount $S_{cal}$ estimated at that time point is obtained as $\Delta x$. In the same manner as described above, when the power storage amount $S_{cal}$ estimated at that time point is equal to or smaller than the second reference power-storage amount 102, the difference between the second reference power-storage amount 102 and the power storage amount $S_{cal}$ estimated at that time point is obtained as $\Delta y$.

Figure 10:
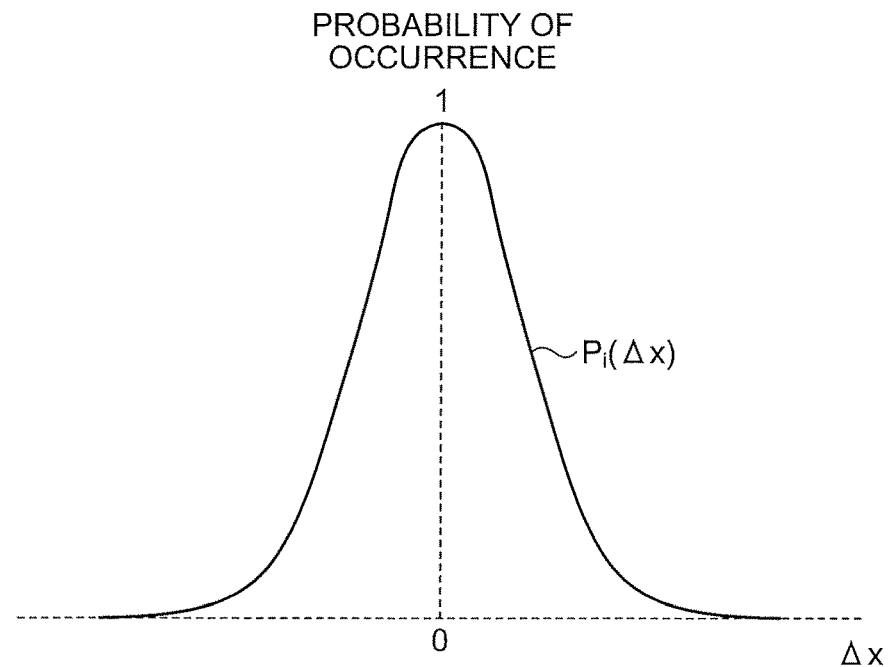
FIG. 10 is a diagram illustrating an example of $P_i(\Delta x)$.

When $\Delta x = 0$ is established, which is equivalent to the average value of $\Delta P_1$, the shortage penalty occurs in the highest probability. Further, as $\Delta x$ becomes greater, the probability of a shortage penalty becomes lower. A function $P_i(\Delta x)$ having the probability of occurrence as described above with respect to $\Delta x$, is defined in advance by using $\Delta P_1$ having been accumulated in the past or the like. FIG. 10 is a diagram illustrating an example of $P_i(\Delta x)$. FIG. 10 illustrates an example using a normal distribution. Similarly to the above, $P_i(\Delta y)$ for the redundancy penalty is obtained in advance. $P_i(\Delta x)$ is not limited to the normal distribution. It is possible that any function is used as long as the function is calculated from $\Delta P_1$ having been accumulated in the past or the like. Further, it is also possible that, instead of using $W_1$ and $\Delta x$, another statistic (a statistical-processing result) is used to define a variable that corresponds to the power storage amount $S_{cal}$, and this variable is used to calculate an expected value of the shortage penalty. Furthermore, it is possible that each of $\Delta P_1$ and $\Delta P_2$ is totaled on a seasonal basis or on a day of the week basis, and different functions are used depending on the season or the day of the week. The same applies to the redundancy penalty.

This function is used to express an expected value $Ct_F$ of a penalty (a shortage penalty and a redundancy penalty) in each time period as the following equation (16). When the power storage amount $S_{cal}$ is equal to or greater than the first reference power-storage amount 101:

$$Ct_F = U_{PS} \times P_i(\Delta x) \times W_1$$

When the power storage amount $S_{cal}$ is equal to or smaller than the second reference power-storage amount 102:

$$Ct_F = U_{PR} \times P_i(\Delta y) \times W_2$$

Cases other than the above ones:

$$Ct_F = 0 \text{ or a constant value} \quad (16)$$

$C_{FIB}$ that is an estimated value of the penalty cost for 24 hours can be expressed as the following equation (17).

$$C_{FIB} = \Sigma_t Ct_F \quad (17)$$

$C_{FIB}$ described above is used as $C_{FIB}$ in the equation (1) in calculating the first evaluation function in the power-purchase plan creation process.

In the present embodiment, instead of using the planned charge-discharge command obtained in the power-purchase plan creation process, a charge-discharge command for 24 hours from the present time, by which the cost is minimized, is recalculated using the second evaluation function. However, the present invention is not limited thereto. It is also possible that recalculation using the second evaluation function is not performed (the charge-discharge control process), but the planned charge-discharge command is transmitted as a charge-discharge command to the charge-discharge control devices 16 and 17.

As described above, in the present embodiment, the first evaluation function, in which the life-span of a power storage device, a power-transmission loss, and other factors are taken into account, is used to create a power purchase plan. This can reduce the power procurement cost. Further, at the time of generating a charge-discharge command, the latest information is used, and also the second evaluation function, in which a penalty incurred by the difference between the power purchase plan and the actual power purchase amount is taken into account, is used to calculate a command value of the charge-discharge command. Due to this configuration, the cost can be evaluated more accurately by the evaluation functions, and the charge-discharge command to minimize the cost can be calculated.

INDUSTRIAL APPLICABILITY

As described above, the supply-demand control device, the charge-discharge control device, the power storage device, the supply-demand control system, and the supply-demand control method according to the present invention are useful for a system in which a community controls power of the whole community, and are particularly suitable for a smart community.

REFERENCE SIGNS LIST

1 voltage control apparatus, 2 busbar, 3-1, 3-2 breaker, 4-1, 4-2 power distribution line, 6, 7 power storage device, 8, 9 power generator, 10 voltage and power-flow measurement device, 11 measurement device, 12 supply-demand control device, 13 communication network, 16, 17 charge-discharge control device, 21 transmission-reception unit, 22 storage unit, 23 power-purchase plan output unit, 24 charge-discharge control unit, 25 actual-result evaluation unit, 101 control unit, 102 input unit, 103 storage unit, 104 display unit, 105 communication unit, 106 output unit, 107 system bus, 231 load and power-generation-amount estimation unit, 232 first-evaluation-function calculation unit, 233 planned charge-discharge command calculation unit, 234 power-purchase plan output unit, 241 load and power-generation- amount estimation unit, 242 second-evaluation-function calculation unit, 243 charge-discharge command calculation unit.

The invention claimed is:

1. A supply-demand control device connected through a communication network to a charge-discharge control device to control charge and discharge of a power storage device connected to a power line in a power system, the supply-demand control device comprising:
a processor to execute a program; and
a memory to store the program which, when executed by the processor, performs processes of,
estimating a first load and a first power generation amount within the power system for a first given period of future as a planned load and power generation amount;
calculating a value of a first evaluation function, which is a sum of a power purchase cost, a natural-discharge loss cost due to natural discharge of the power storage device where the natural-discharge loss is a function that depends on a power storage amount in the power storage device, a storage-battery life-span cost that is a cost increasing as a life-span of the power storage device decreases which includes cost for replacing the power storage device, a power-transmission loss cost for a transformer and the power line managed by the supply-demand control device different from an electric-power provider, and a charge-discharge loss cost, for a future given period based on the planned load and power generation amount, a charge-discharge command amount for the charge-discharge control device to control charge and discharge of the power storage device, and a power storage amount in the power storage device;
calculating a charge-discharge command amount based on the value of the first evaluation function;
creating a power purchase plan based on the charge-discharge command amount,
estimating a second load and a second power generation amount within the power system for a second given period from a present time, wherein the second load and the second power generation amount is estimated temporally after the first load and the first power generation amount is estimated;
calculating a value of a second evaluation function, the second evaluation function being a sum of a power purchase cost when power is purchased based on the power purchase plan for the given period from a present time, a natural-discharge loss cost due to the natural discharge of the power storage device where the natural-discharge loss is a function that depends on a power storage amount in the power storage device, a storage-battery life-span cost that is a cost increasing as a life-span of the power storage device decreases which includes cost for replacing the power storage device, a power-transmission loss cost for the transformer and the power line managed by the entity different from the electric-power provider, a charge-discharge loss cost, and a penalty cost that is a cost caused based on a difference between a power purchase amount actually purchased and a power purchase amount in the power purchase plan, based on the second load and the second power generation amount; and
calculating a second charge-discharge command amount to be instructed to the charge-discharge control device based on the value of the second evaluation function; and controlling charge and discharge of the power storage device based on the charge-discharge command amount or the second charge-discharge command amount.

2. The supply-demand control device according to claim 1, wherein in calculating the first-evaluation-function, a cooling power cost caused due to power required for cooling and controlling a power storage device is obtained, and the cooling power cost is further added to the first evaluation function.

3. The supply-demand control device according to claim 1, wherein the penalty cost includes a shortage penalty cost caused when a power purchase amount actually purchased is greater than a power purchase amount in the power purchase plan, and a redundancy penalty cost caused when a power purchase amount actually purchased is smaller than a power purchase amount in the power purchase plan.

4. The supply-demand control device according to claim 1, wherein in calculating the second-evaluation-function calculation, a cooling power cost caused due to power required for cooling and controlling a power storage device is obtained, and the cooling power cost is further added to the second evaluation function.

5. The supply-demand control device according to claim 1, wherein the natural-discharge loss cost is calculated as a value that is proportional to a result of multiplication of a power storage amount and a rate of decrease in a power storage amount due to natural discharge in the power storage device.

6. The supply-demand control device according to claim 1, wherein the storage-battery life-span cost is calculated as a sum of a value that is proportional to a charge command amount to the power storage device and a value that is proportional to a result of multiplication of a power storage amount and an absolute value of a charge-discharge command amount to the power storage device.

7. The supply-demand control device according to claim 1, wherein the power-transmission loss cost is calculated as a value that is proportional to a sum of a power-transmission loss on a power line within the power system, and a power-transmission loss in a transformer within the power system.

8. The supply-demand control device according to claim 1, wherein the charge-discharge loss cost is calculated as a value that is proportional to a charge command amount to the power storage device.

9. The supply-demand control device according to claim 1, wherein the supply-demand control device receives measurement information related to a power storage amount from the charge-discharge control device, and the processor further calculates a power storage amount in the power storage device based on the measurement information.

10. A supply-demand control device connected through a communication network to a charge-discharge control device to control charge and discharge of a power storage device connected to a power line in a power system, the supply-demand control device comprising:
a processor to execute a program; and
a memory to store the program which, when executed by the processor, performs processes of,
estimating a load and a power generation amount within the power system for a given period of future as a planned load and power generation amount;
calculating a value of a first evaluation function, which is a sum of a power purchase cost, a natural-discharge loss cost due to natural discharge of the power storage device where the natural-discharge loss is a function that depends on a power storage amount in the power storage device, a storage-battery life-span cost that is a cost increasing as a life-span of the power storage device decreases which includes cost for replacing the power storage device, a power-transmission loss cost for a transformer and the power line managed by the supply-demand control device different from an electric-power provider, and a charge-discharge loss cost, for the future given period based on the planned load and power generation amount, a charge-discharge command amount for the charge-discharge control device to control charge and discharge of the power storage device, and a power storage amount in the power storage device;
calculating a charge-discharge command amount based on the value of the first evaluation function;
creating a power purchase plan based on the charge-discharge command amount, and actual-result evaluating to hold a difference between a power purchase amount in the power purchase plan and a power purchase amount actually purchased, perform statistical processing on the difference in past held therein, and calculate a penalty estimated value that is an estimated value of penalty cost based on a result of the statistical processing, and a power storage amount in the power storage device, wherein
in calculating the first-evaluation-function, the penalty estimated value is further added to the first evaluation function; and
controlling charge and discharge of the power storage device based on the charge-discharge command amount.

11. The supply-demand control device according to claim 10, wherein
in the actual-result evaluating,
a first average value of absolute values of differences of when a power purchase amount actually purchased is greater than a power purchase amount in a power purchase plan is obtained as a first average value, and an amount obtained by subtracting the first average value from a maximum value of a power storage amount in the power storage device is set as a first reference amount, and
a second average value of absolute values of the differences of when a power purchase amount actually purchased is smaller than a power purchase amount in a power purchase plan is also obtained as a second average value, and an amount obtained by adding the second average value to a minimum value of a power storage amount in the power storage device is set as a second reference amount,
and,
in calculating the first-evaluation-function,
a first probability function defined in advance as a function of a first difference that is a difference from the first reference amount is held, and a second probability function defined in advance as a function of a second difference that is a difference from the second reference amount is held, and
when a power storage amount in the power storage device is greater than the first reference amount, a value of the first probability function, in a case where the first difference is a value obtained by subtracting the first reference amount from a power storage amount in a power storage device, is calculated to calculate a first expected value based on the value of the first probability function, and the first average value, and when a power storage amount in the power storage device is smaller than the second reference amount, a value of the second probability function, in a case where the second difference is a value obtained by subtracting a power storage amount in a power storage device from the second reference amount, is calculated to calculate a second expected value based on the value of the second probability function, and the second average value, and the penalty estimated value is calculated based on the first expected value and the second expected value.

12. A supply-demand control device connected through a communication network to a charge-discharge control device to control charge and discharge of a power storage device connected to a power line in a power system, the supply-demand control device comprising:

a processor to execute a program; and a memory to store the program which, when executed by the processor, performs processes of, estimating a first load and a first power generation amount within the power system for a first given period of future as a planned load and power generation amount;

creating a power purchase plan based on the planned load and power generation amount, a natural-discharge loss cost due to natural discharge of the power storage device where the natural-discharge loss is a function that depends on a power storage amount in the power storage device, and a power-transmission loss cost for a transformer and the power line managed by the supply-demand control device different from an electric-power provider;

estimating a second load and a second power generation amount within the power system for a second given period from a present time, wherein the second load and the second power generation amount is estimated temporally after the first load and the first power generation amount is estimated;

based on the second load and the second power generation amount, calculating an evaluation function including a penalty cost that is a cost caused from a difference between a power purchase amount actually purchased and a power purchase amount in the power purchase plan;

calculating a charge-discharge command amount to be instructed to the charge-discharge control device based on a value of the evaluation function; and controlling charge and discharge of the power storage device based on the charge-discharge command amount.

13. A system comprising:

a charge-discharge control device that controls charge and discharge of a power storage device connected to a power line in a power system, and a supply-demand control device connected through a communication network to the charge-discharge control device, wherein the supply-demand control device creates a power purchase plan based on a first value of a first evaluation function, which is a sum of a power purchase cost, a natural-discharge loss cost due to natural discharge of the power storage device where the natural-discharge loss is a function that depends on a power storage amount in the power storage device, a storage-battery life-span cost that is a cost increasing as a life-span of the power storage device decreases which includes cost for replacing the power storage device, a power-transmission loss cost for a transformer and the power line managed by the supply-demand control device different from an electric-power provider, and a charge-discharge loss cost, the charge-discharge control device receives from the supply-demand control device a charge-discharge command amount calculated in the supply-demand control device based on a second value of a second evaluation function, which is a sum of a power purchase cost when power is purchased based on the power purchase plan, a natural-discharge loss cost due to the natural discharge of the power storage device where the natural-discharge loss being a function that depends on a power storage amount in the power storage device, a storage-battery life-span cost that is a cost increasing as a life-span of the power storage device decreases which includes cost for replacing the power storage device, a power-transmission loss cost for the transformer and the power line managed by the supply-demand control device different from the electric-power provider, a charge-discharge loss cost, and a penalty cost that is a cost caused based on a difference between a power purchase amount actually purchased and a power purchase amount in the power purchase plan, and the charge-discharge control device controls charge and discharge of the power storage device based on the received charge-discharge command amount.

14. The system according to claim 13, wherein the charge-discharge control device transmits measurement information related to a power storage amount in the power storage device to the supply-demand control device.

15. A system comprising:

a charge-discharge control device to control charge and discharge of a power storage device connected to a power line in a power system, and a supply-demand control device connected through a communication network to the charge-discharge control device, wherein the supply-demand control device includes a processor to execute a program; and a memory to store the program which, when executed by the processor, preforms processes of, estimating a first load and a first power generation amount within the power system for a first given period of future as a planned load and power generation amount, creating a power purchase plan based on the planned load and power generation amount, a natural-discharge loss cost due to natural discharge of the power storage device where the natural-discharge loss is a function that depends on a power storage amount in the power storage device, and a power-transmission loss for a transformer and the power line managed by the supply-demand control device different from an electric-power provider, estimating a second load and a second power generation amount within the power system for a second given period from a present time, wherein the second load and the second power generation amount is estimated temporally after the first load and the first power generation amount is estimated, based on the second load and the second power generation amount to calculate an evaluation function including a penalty cost that is a cost caused based on a difference between an actual power purchase amount and a power purchase amount in the power purchase plan, and calculating a charge-discharge command amount to be instructed to the charge-discharge control device based on a value of the evaluation function, and the charge-discharge control device controls charge and discharge of the power storage device based on the charge-discharge command amount received from the supply-demand control device.

16. The system according to claim 15, wherein the charge-discharge control device transmits measurement information related to a power storage amount in the power storage device to the supply-demand control device.

17. The system according to claim 15, wherein the charge-discharge control device is integrated with the power storage device.

* * * * *